(12) United States Patent
Maskara et al.

(10) Patent No.: US 11,277,372 B2
(45) Date of Patent: Mar. 15, 2022

(54) NAME SERVER MANAGEMENT OF DOMAIN NAME SYSTEMS USING VIRTUAL NAME SERVERS

(71) Applicant: Microsoft Technology Licensing, LLC, Redmond, WA (US)

(72) Inventors: Rajesh Kumar Maskara, Redmond, WA (US); Bradley D. Rutkowski, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 16/667,399

(22) Filed: Oct. 29, 2019

(65) Prior Publication Data

US 2021/0126892 A1    Apr. 29, 2021

(51) Int. Cl.
| | | |
|---|---|---|
| G06F 15/16 | (2006.01) | |
| H04L 61/4511 | (2022.01) | |
| H04L 41/0686 | (2022.01) | |
| H04L 61/5007 | (2022.01) | |

(52) U.S. Cl.
CPC ...... H04L 61/1511 (2013.01); H04L 41/0686 (2013.01); H04L 61/2007 (2013.01)

(58) Field of Classification Search
None
See application file for complete search history.

(56) References Cited

U.S. PATENT DOCUMENTS

| | | | | |
|---|---|---|---|---|
| 7,680,876 B1* | 3/2010 | Cioli | ........... | H04L 61/1511 709/201 |
| 8,200,842 B1* | 6/2012 | Lau | ........... | H04L 43/0817 709/245 |
| 8,972,580 B2 | 3/2015 | Fleischman et al. | | |
| 9,059,884 B2 | 6/2015 | Robinson et al. | | |
| 9,917,852 B1* | 3/2018 | Xu | ........... | H04L 63/0236 |
| 2003/0225924 A1 | 12/2003 | Jung et al. | | |
| 2004/0039798 A1 | 2/2004 | Hotz et al. | | |

(Continued)

FOREIGN PATENT DOCUMENTS

WO    2017007982 A1    1/2017

OTHER PUBLICATIONS

"Amazon Route 53", Retrieved from: https://docs.aws.amazon.com/Route53/latest/DeveloperGuide/route53-dg.pdf#white-label-name-servers, Apr. 1, 2013, 552 Pages.

(Continued)

*Primary Examiner* — Brian Whipple
*Assistant Examiner* — Gregory P Tolchinsky
(74) *Attorney, Agent, or Firm* — Alleman Hall Creasman & Tuttle LLP

(57) ABSTRACT

A method and system for managing domain name system (DNS) name servers using virtual name servers is disclosed. A plurality of virtual name servers are mapped to a plurality of actual name servers of the DNS. Each actual name server stores at least one record identifying a domain and an Internet Protocol (IP) address of a computer hosting that domain. Information is received from a monitoring service computer identifying which actual name servers are unhealthy and which actual name servers are healthy. Based on this information, the mapping of each virtual name server that is mapped to an unhealthy actual name server is updated to map to one of the healthy actual name servers.

15 Claims, 7 Drawing Sheets

(56) References Cited

U.S. PATENT DOCUMENTS

| | | | |
|---|---|---|---|
| 2004/0095962 A1* | 5/2004 | Ohta | H04L 61/1511 370/475 |
| 2006/0112176 A1* | 5/2006 | Liu | H04L 29/12811 709/245 |
| 2013/0151725 A1* | 6/2013 | Baginski | H04L 61/251 709/245 |
| 2014/0006577 A1* | 1/2014 | Joe | H04L 61/303 709/223 |
| 2015/0319097 A1* | 11/2015 | Hyatt | H04L 43/00 709/224 |
| 2017/0222978 A1* | 8/2017 | Cathrow | H04L 67/42 |
| 2017/0339095 A1* | 11/2017 | Lei | H04L 41/12 |
| 2018/0351976 A1* | 12/2018 | Shitrit-Efergan | H04L 63/1458 |

OTHER PUBLICATIONS

"CloudDNS: Overview", Retrieved from: https://web.archive.org/web/20190629090448/https:/cloud.google.com/dns/docs/overview, Jun. 29, 2019, 23 Pages.

"Configuring White-Label Name Servers", Retrieved from: https://web.archive.org/web/20171223074952/http:/docs.aws.amazon.com:80/Route53/latest/DeveloperGuide/white-label-name-servers.html, Dec. 23, 2017, 8 Pages.

"DNS Failover: Basic Conceptsand Limitations", Retrieved from: https://ns1.com/resources/dns-failover-basic-concepts-and-limitations. Retrieved Date: Aug. 29, 2019, 7 Pages.

Andrews, M., "Negative Caching of DNS Queries (DNS NCACHE)", Retrieved from: https://tools.ietf.org/html/rfc2308, Mar. 1998, 19 Pages.

McCullagh, et al., "Hybrid Cloud DNS Options for Amazon VPC", Retrieved from: https://d1.awsstatic.com/whitepapers/hybrid-cloud-dns-options-for-vpc.pdf, Nov. 2018, 27 Pages.

"Using DNS as a Cheap Fail over and Load-Balancer", https://blog.l0cal.com/2015/04/30/using-dns-as-a-cheap-failover-and-load-balancer/, Apr. 30, 2015, 6 Pages.

"International Search Report and Written Opinion Issued in PCT Application No. PCT/US2020/056222", dated Feb. 5, 2021, 14 Pages.

* cited by examiner

NAME SERVER MANAGEMENT OF DOMAIN NAME SYSTEMS USING VIRTUAL NAME SERVERS

BACKGROUND

A domain name system (DNS) resolves domain names to provide IP addresses to client computers so web browsers can load the requested websites. Users look up websites by typing in domain names, such as microsoft.com or office.com. These domain names have to be translated into IP addresses before the websites can be loaded to the client computers. Client computers will query DNS servers to retrieve the IP addresses for the computers hosting the domains they are interested in. A DNS may include a plurality of name servers. Each name server stores records that map domains to IP addresses. When a DNS query is received from a client computer, the DNS will perform a look up to determine which name server has authority over the domain. The authoritative name server will then be queried and will respond with one or more IP addresses associated with the requested domain or hostname. The client computer may then use the returned one or more IP addresses to load the requested website.

To provide for fault tolerance, a DNS zone may operate in an active/active configuration in which a DNS and its name servers are duplicated. This configuration provides protection against some failures, but there are some errors and failures that the active/active configuration does not protect against. For example, when a name server issue a NXDOMAIN response for a valid query, the client computer receiving the response will be instructed that the queried domain name does not exist and will not attempt to re-query against another DNS. Therefore, the current configurations of DNS do not account for these types of errors and failures that result in negative customer impact when clients are unable to load the requested websites.

SUMMARY

A method and system for managing domain name system (DNS) name servers using virtual name servers is disclosed. A plurality of virtual name servers are mapped to a plurality of actual name servers of the DNS. Each actual name server stores at least one record identifying a domain and an Internet Protocol (IP) address of a computer hosting that domain. Information is received from a monitoring service computer identifying which actual name servers are unhealthy and which actual name servers are healthy. Based on this information, the mapping of each virtual name server that is mapped to an unhealthy actual name server is updated to map to one of the healthy actual name servers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
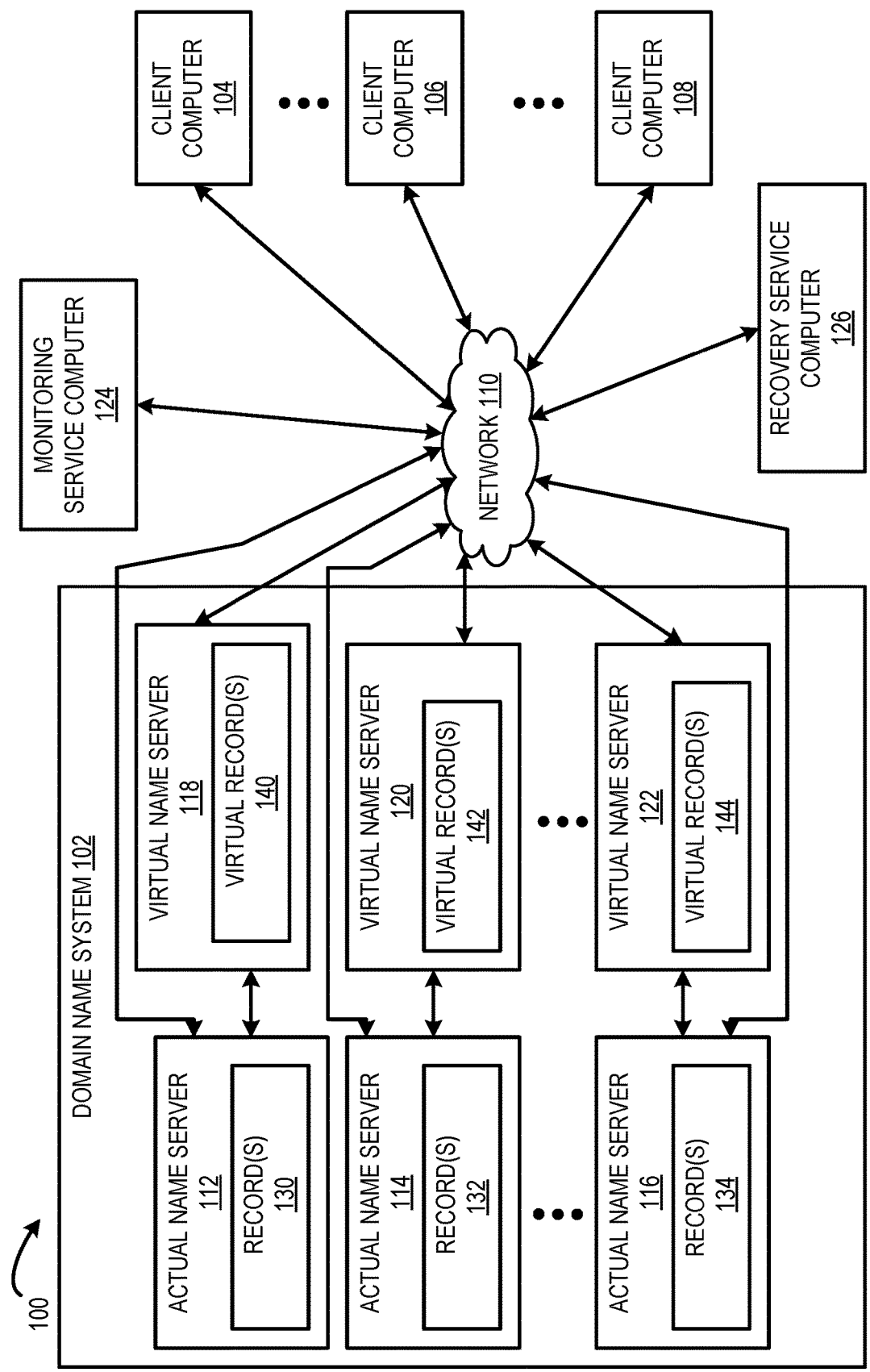
FIG. 1 schematically shows an example computing environment including a domain name system (DNS) that has a plurality of actual name servers and virtual name servers.

Name servers of a domain name system (DNS) may have different types of failure scenarios. In some instances, when a client computer receives certain error codes, the client may re-query a different DNS. As one example, a name server failure may result in a client computer receiving an error code of SERVFAIL. To protect against such failure scenarios, a DNS zone may be configured to operate in an active/active configuration where a duplicate DNS includes duplicate name server records stored on duplicate name servers to provide backup in case one of the name servers enters a failure scenario. In this way, a query of a client computer may be resolved by the active duplicate name server of the duplicate DNS when one of the name servers fails.

However, in other instances, a client computer may receive an error code where the client computer does not attempt to re-query any other DNS. For example, a name server failure may result in the name server erroneously issuing an NXDOMAIN error code that instructs the client computer that a queried domain or hostname does not exist. When a client computer receives an NXDOMAIN error, the client computer does not attempt to re-query against any other DNS until a time-to-live (TTL) parameter has expired. When a name server exhibits such behavior, it can be difficult to shift network traffic away from the unhealthy name server because the TTL values for name server records are generally quite long and may take days or weeks to be effective for DNS clients. Additionally, shifting network traffic away from an unhealthy name server of the DNS by updating name server entries for the domain with a DNS registrar requires unlocking the domain, many levels of approval, and manual updates that result in a long mean time to recovery (MTTR).

Accordingly, the present description is directed to an approach for managing name servers in a DNS in a manner that addresses the above described issues. In one embodiment, a plurality of virtual name servers are mapped to a plurality of actual name servers of the DNS. Each actual name server stores at least one record identifying a domain and an Internet Protocol (IP) address of a computer hosting that domain. A monitoring service computer monitors resolution of domains against each name server. The monitoring service computer determines which name servers are unhealthy and which name servers are healthy and provides this information to a recovery service computer. The recovery service computer updates the mapping of the virtual name servers based on the information received from the monitoring service computer. Each virtual name server that is mapped to an unhealthy actual name server is updated to map to a healthy actual name server.

In this way, the MTTR for an unhealthy name server of a DNS may be reduced relative to prior approaches. Furthermore, in some implementations, virtual name server records may include lower TTL values than TTL values of the actual name server records. Such lower TTL values allow for network traffic to be shifted away from an unhealthy name server to a healthy name server more quickly than prior approaches.

FIG. 1 schematically shows an example computing system 100 including a domain name system (DNS) 102. The DNS 102 may be associated with any suitable entity. A plurality of client computers (e.g., 104, 106, and 108) are communicatively coupled to the DNS 102 via network 110 and may send DNS queries to DNS 102 to resolve domain names. Any suitable number of different client computers (e.g. 104, 106, or 108) may query the DNS 102. When a client computer (e.g. 104, 106, or 108) sends a DNS query that includes a requested domain or hostname to the DNS 102 via the computer network 110, the DNS 102 will resolve the requested domain and respond with one or more IP addresses. The client computer that sent the DNS query may then use the one or more IP addresses received from DNS 102 to load the desired website associated with the domain or hostname. As an example, a user may type a domain name into a web browser, such as typing "microsoft.com" into Internet Explorer. In another example, a user may perform a search for a specific topic and click on a link provided as one of the results of the search to request a website. When the user requests a domain name, the domain name needs to be translated into an IP address before the website can be loaded to the client computer. Therefore, a client computer (e.g. 104, 106, or 108) may query the DNS 102 to resolve the domain name. The DNS 102 will perform a look up of the domain name. The record that is associated with the domain name is retrieved, and the DNS 102 will respond to the client computer with one or more IP addresses associated with the domain. The client computer that queried the DNS 102 may then use the one or more IP addresses received from DNS 102 to load the desired website associated with the domain name.

As shown in FIG. 1, the DNS 102 includes one or more actual name servers (e.g. 112, 114, or 116). The actual name servers may be any type of computer suitable for storing records. The DNS 102 may include any suitable number of actual name servers organized according to any suitable hierarchy or organizational scheme. In one exemplary implementation, the plurality of actual name servers (e.g. 112, 114, or 116) may be in a same DNS zone. In other implementations, different actual name servers may be in different DNS zones. Each DNS zone is a distinct portion of the DNS namespace over which a DNS has authority. A DNS zone may contain multiple domains and subdomains.

Each actual name servers (e.g. 112, 114, or 116) is configured to store one or more records (e.g. 130, 132, or 134) in a memory of the actual name server. Each actual name server (e.g. 112, 114, or 116) may be configured to store any suitable number of records. An actual name server (e.g. 112, 114, or 116) may store one or more records (e.g. 130, 132, or 134) that include information about a specific domain including a domain name and an IP address of a computer hosting the domain. The IP address in the record may be formatted according to any appropriate protocol or specification, such as internet protocol version 4 (IPv4) or internet protocol version 6 (IPv6). When the DNS 102 receives a DNS query to resolve a domain name, the DNS 102 performs a look up of the domain name. The DNS 102 will retrieve the record (e.g. 130, 132, or 134) associated with the domain name. The DNS 102 can then respond to the DNS query by providing the one or more IP addresses associated with the requested domain name specified in the DNS query.

As shown in FIG. 1, the DNS 102 includes one or more virtual name servers (e.g. 118, 120, or 122). The DNS 102 may include any suitable number of virtual name servers. The virtual name servers may be any type of computer suitable for storing virtual records. In one exemplary embodiment, the virtual name servers (e.g. 118, 120, or 122) may be in the same DNS zone as the actual name servers (e.g. 112, 114, or 116). In an alternative implementation, a virtual DNS zone may be created, and the actual name servers (e.g. 112, 114, or 116) may be in the actual DNS zone while the virtual name servers (e.g. 118, 120, or 122) may be in the virtual DNS zone.

Each virtual name server (e.g. 118, 120, or 122) is configured to store one or more virtual records (e.g. 140, 142, or 144) in a memory of the virtual name server. Each virtual name server (e.g. 118, 120, or 122) may be configured to store any suitable number of virtual records.

Each virtual name server (e.g. 118, 120, or 122) is a logical abstraction of an actual name server. Each virtual name server (e.g. 118, 120, or 122) is mapped to one of the plurality of actual name servers (e.g. 112, 114, or 116). The virtual name servers (e.g. 118, 120, and 122) may be registered with the registrar such that the virtual name servers may be made public and discoverable by other computers via network 110. The virtual name servers (e.g. 118, 120, and/or 122) are used in place of the actual name servers (e.g. 112, 114, and/or 116) in the registration of the DNS zone. In this manner, DNS queries for the domains with which the DNS zone has authority will be directed to the virtual name servers (e.g. 118, 120, and/or 122) instead of the actual name servers (e.g. 112, 114, and/or 116). As an example, the exampledomain.com zone may be registered with the below exemplary virtual name servers:

exampledomain.com 3600 IN NS ns1a-logical.virtualdns.net exampledomain.com 3600 IN NS ns2a-logical.virtualdns.com exampledomain.com 3600 IN NS ns3 a-logical.virtualdns.info exampledomain.com 3600 IN NS ns4a-logical.virtualdns.org exampledomain.com 3600 IN NS ns1b-logical.virtualdns.net exampledomain.com 3600 IN NS ns2b-logical.virtualdns.com exampledomain.com 3600 IN NS ns3b-logical.virtualdns.info exampledomain.com 3600 IN NS ns4b-logical.virtualdns.org The registration includes a domain ('exampledomain.com') and a name server that has authority to resolve the domain (e.g., virtual name server ns1a-logical or virtual name server ns4b-logical). The registration also specifies the DNS zone having authority over the domain (e.g. virtual DNS zone 'virtualdns'). The registration may also include the TTL value (e.g. 3600 seconds) as well the top level domain (e.g. net, com, info, or org). The registration may specify any suitable domain, name server, top level domain, and TTL value.

In one example, when a client computer 108 queries the DNS 102 to resolve a domain, a look up of the domain is performed. The registered virtual name server (e.g. 118, 120, 122) that is listed as having authority to resolve the domain is queried. The virtual name server record that is associated with the domain is retrieved. The virtual name server record is mapped to or points to an actual name server record, and this actual name server record is retrieved. The actual name server will then be queried and will respond with the IP address of the computer hosting the requested domain to the client computer 108 via network 110. The client computer 108 may then load the requested website associated with the domain using the IP address returned from DNS 102.

Below are example virtual name server records that may be stored in a virtual name server:

ns1a-logical.virtualdns.net 60 A <ipv4 address of actual name server> ns1a-logical.virtualdns.net 60 AAAA <ipv6 address of actual name server>

The exemplary virtual name server records specify a virtual name server, a low TTL (e.g. 60 seconds), a record type (e.g. A or AAAA), and an IP address of an actual name server (e.g. name server 'ns1' of DNS1) that the virtual name server maps to. If the actual name server is not responding to queries correctly or returning unexpected responses, the virtual name server record may be updated to change the IP address of the A/AAAA record to the IP address of a different name server that is healthy (e.g. the IP address of name server 'ns2' of DNS1 or the IP address of name server 'ns3' of DNS2). Since the TTL is low, this update will take effect in a short amount of time. In this manner, traffic may be diverted from erroring name servers quickly and efficiently.

A monitoring service computer 124 is configured to monitor the plurality of actual name servers (e.g. 112, 114, and 116) and to determine which actual name servers are healthy or which actual name servers are unhealthy. In one exemplary implementation, an actual name server is considered healthy if the actual name server returns one or more IP addresses, such as A or AAAA addresses. In this case, any actual name server that returns a response that does not contain one or more IP addresses in the answer section would be considered an unhealthy actual name server. In another implementation, only the actual name servers that return a response that matches one or more errors codes (e.g. NXDOMAIN) would be considered unhealthy and any actual name servers that return any response that does not match one of the unhealthy error codes would be considered healthy. The criteria for what is considered healthy and unhealthy may be specified in any suitable manner to identify the undesirable behavior of the name servers and to distinguish between the unhealthy and healthy name servers.

In one exemplary implementation, the monitoring service computer 124 may monitor the responses to DNS queries of each actual name server to determine which actual name servers are returning undesirable responses. In another exemplary implementation, the monitoring service computer 124 may send test DNS queries to each actual name server and monitor the responses to these test queries to determine which actual name servers are returning undesirable responses.

When the monitoring service computer 124 discovers that an actual name server is returning undesirable responses to DNS queries, the monitoring service computer 124 may apply a health metric to determine whether the actual name server is considered unhealthy. In one exemplary implementation, the health metric 120 specifies that an actual name server is unhealthy based on at least a threshold number or percentage of responses to DNS queries that are different than an expected response. The threshold number or percentage may be any suitable number of responses or percentage of responses. In one example, the health metric may specify that if more than 10 percent of DNS queries are returned with a response other than a list of IP addresses, then the actual name server is deemed to be unhealthy. Conversely, if less than 10 percent of DNS queries are returned with a response other than a list of IP addresses (i.e., more than 90 percent of DNS queries receive responses with a list of IP addresses), then the actual name server may be deemed to be healthy according to the health metric.

As another example, the health metric may specify that an actual name server is considered unhealthy based on at least a threshold number or percentage of responses from DNS queries including a specific error code (e.g. a NXDOMAIN error) from the actual name server. Conversely, an actual name server is considered healthy if less than the threshold number or percentage of responses to DNS queries include the specified error code (e.g. a NXDOMAIN error).

The health metric may specify that an actual name server is healthy or unhealthy in any suitable manner including but not limited to specifying a threshold number or percentage of responses received from the actual name server that do not include a list of IP addresses, that include a specific error code (e.g. NXDOMAIN), that include a timeout message, or that include any other undesired response. In some implementations, any combination of the above described examples may be used by the health metric to determine whether an actual name server is health or unhealthy.

When the monitoring service computer 124 determines that an actual name server is unhealthy, the monitoring service computer 124 may send an alert to a recovery service computer 126 via the computer network 110. In one exemplary implementation, an alert may be issued each time an actual name server is identified as being unhealthy. In another exemplary implementation, the monitoring service computer 124 is configured to periodically send, to the recovery service computer 126, a list of the unhealthy actual name servers and healthy actual name servers. The monitoring service computer 124 may send the list to the recovery service computer 126 according to any suitable time period.

The recovery service computer 126 is configured to handle mitigation of unhealthy actual name servers by diverting network traffic to healthy actual name servers. In one exemplary implementation, as shown in FIG. 1, the recovery service computer 126 may be separate from DNS 102. In another implementation, the recovery service computer may be part of the DNS 102 or operated by the same entity. When the recovery service computer 126 receives an indication from the monitoring service computer 124 that one or more actual name servers are unhealthy, the recovery service computer 126 will update the virtual name server records (e.g. 140, 142, or 144) such that any virtual name server record that is mapped to an unhealthy actual name server will be updated to map to a healthy actual name server. In one exemplary implementation, the healthy name server may be chosen at random from among all the healthy name servers. In other implementations, the healthy name server may be chosen by any suitable method from among the healthy name servers.

As an example, below are the A/AAAA records for virtual name servers of the exampledomain.com zone:

ns1a-logical.virtualdns.net. 60 IN A <XYZ DNS NS1 IP ADDRESS> ns2a-logical.virtualdns.com. 60 IN A <XYZ DNS NS2 IP ADDRESS> ns3a-logical.virtualdns.info. 60 IN A <XYZ DNS NS3 IP ADDRESS>
ns4a-logical.virtualdns.org. 60 IN A <XYZ DNS NS4 IP ADDRESS>
ns1b-logical.virtualdns.net. 60 IN A <WZX DNS NS1 IP ADDRESS>
ns2b-logical.virtualdns.com. 60 IN A <WZX DNS NS2 IP ADDRESS>
ns3b-logical.virtualdns.info. 60 IN A <WZX DNS NS3 IP ADDRESS>
ns4b-logical.virtualdns.org. 60 IN A <WZX DNS NS4 IP ADDRESS>

In the illustrated example above, the recovery service computer 126 receives an indication from the monitoring service computer 124 that all the name servers NS1, NS2, NS3, and NS4 of XYZ DNS are intermittently and erroneously responding with NXDOMAIN error responses, and are therefore unhealthy. The recovery service computer 126 will update the A/AAAA records of the virtual name servers ns1a-logical, ns2a-logical, ns3a-logical, and ns4a-logical to not point to any of the unhealthy actual name servers NS1, NS2, NS3, and NS4 of XYZ DNS. Instead, the virtual name server records will be updated to point to a healthy actual name server, such as actual name servers NS1, NS2, NS3, or NS4 of WZX DNS. Below is one example of the updated A/AAAA records for virtual name servers of the example-domain.com zone:

ns1a-logical.virtualdns.net. 60 IN A <WZX DNS NS1 IP ADDRESS>
ns2a-logical.virtualdns.com. 60 IN A <WZX DNS NS2 IP ADDRESS>
ns3a-logical.virtualdns.info. 60 IN A <WZX DNS NS3 IP ADDRESS>
ns4a-logical.virtualdns.org. 60 IN A <WZX DNS NS4 IP ADDRESS>
ns1b-logical.virtualdns.net. 60 IN A <WZX DNS NS1 IP ADDRESS>
ns2b-logical.virtualdns.com. 60 IN A <WZX DNS NS2 IP ADDRESS>
ns3b-logical.virtualdns.info. 60 IN A <WZX DNS NS3 IP ADDRESS>
ns4b-logical.virtualdns.org. 60 IN A <WZX DNS NS4 IP ADDRESS>

In other examples, the virtual name server records that map to the unhealthy actual name servers of XYZ DNS may be updated in any suitable manner to point to any of the healthy actual name servers of WZX DNS. For example, the virtual name server record for virtual name server ns1a-logical may be updated to point to actual name server WZX DNS NS2 or the virtual name server record for virtual name server ns2a-logical may be updated to point to actual name server WZX DNS NS4. The healthy actual name server selected may be chosen at random from among the healthy actual name servers or by any other suitable method.

In the illustrated implementation, the monitoring service computer 124 is separate from the DNS 102. In this exemplary implementation, the monitoring service computer 124 may be operated by a third-party entity. In other implementations, the monitoring service computer 124 may be a part DNS 102 or operated by the same entity.

The computing system 100 may include one or more additional DNS. For example, computing system 100 may operate in an active/active configuration for the DNS zone. In this case, computing system 100 would include an additional DNS with additional name servers that duplicate the DNS 102 and its name servers. In this manner, there is additional built in fault tolerance in computing system 100.

In another exemplary implementation, when computing system 100 operates in an active/active configuration for the DNS zone, computing system 100 may include a hidden master computer that is configured to propagate updated mappings for the name servers to both DNSs in computing system 100. In other implementations, the recovery service computer 126 may be configured to propagate such updates directly to each name server of each DNS in computing system 100.

Figure 2:
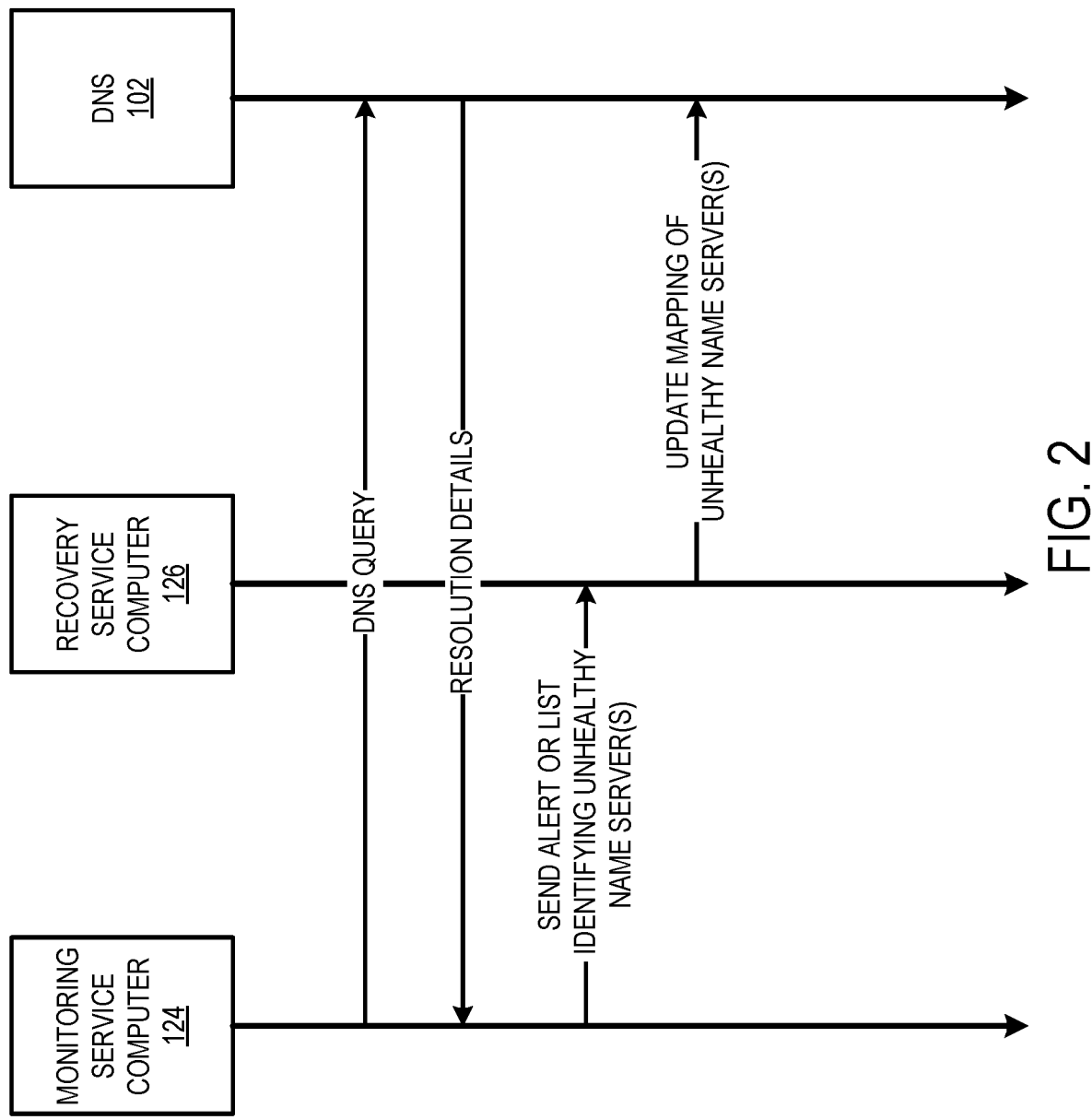
FIG. 2 diagrammatically shows example communication between different computers to manage mapping of name servers of a DNS.

FIG. 2 diagrammatically shows example communication between different computers to manage mapping of name servers of a DNS (e.g. DNS 102). The monitoring service computer 124 tests whether each of a plurality of actual name servers (e.g. 112, 114, or 116 of FIG. 1) is healthy by sending DNS queries to the actual name servers (e.g. 112, 114, or 116) of the DNS (e.g. 102). The actual name servers (e.g. 112, 114, or 116) of the DNS 102 will provide resolution details back to the monitoring service computer 124. Depending on the health of the different actual name servers in DNS 102, the different actual name servers may provide different resolution details back to the monitoring service computer 124. For example, the actual name server may resolve the DNS query and respond with one or more IP addresses, indicating that the actual name server is healthy and responding correctly. In other instances, the actual name server may return an unexpected response (e.g., timeout error, SERVFAIL error code, NXDOMAIN error code, etc.). If the actual name server returns an unexpected response to the DNS query, the monitoring service computer 124 may apply a health metric to determine whether the actual name server is unhealthy or healthy. The health metric may be any suitable metric to determine whether an actual name server is unhealthy, such as determining whether the unexpected responses from the actual name server have reached a threshold number or percentage of responses deemed to identify the actual name server as unhealthy.

In one exemplary implementation, when the monitoring service computer 124 determines that one or more actual name servers are unhealthy, the monitoring service computer 124 sends an alert to the recovery service computer 126. The alert identifies one or more actual name servers that are unhealthy. In another exemplary implementation, the monitoring service computer 124 may periodically send to the recovery service computer 126 a list identifying the healthy actual name servers and unhealthy actual name servers.

When the recovery service computer 126 receives an indication (e.g. an alert or list) from the monitoring service computer 124 that one or more of the actual name servers are unhealthy, the recovery service computer 126 will communicate with the DNS 102 to update the virtual name server records such that any virtual server record that is mapped to an unhealthy actual name server will be updated to map to a healthy actual name server. In one exemplary implementation, the healthy name server may be chosen at random from among all the healthy name servers. In other implementations, the healthy name server may be chosen by any suitable method from among the healthy name servers. By performing such monitoring and recovery operations, failure scenarios of unhealthy name servers of the DNS may be mitigated by diverting network traffic to healthy name servers quickly and efficiently.

Figure 3:
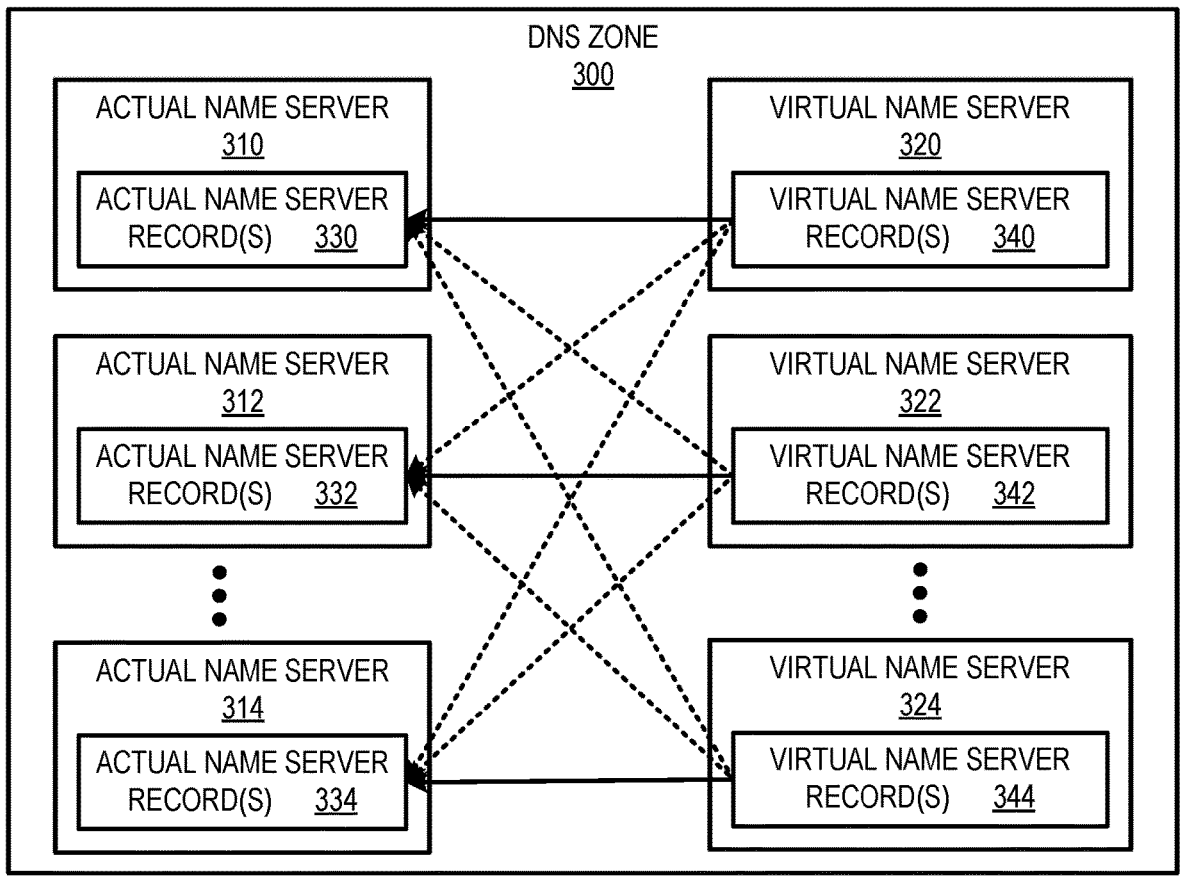
FIG. 3 schematically shows an example implementation in which actual name servers and virtual name servers are hosted in a same DNS zone.
Figure 4:
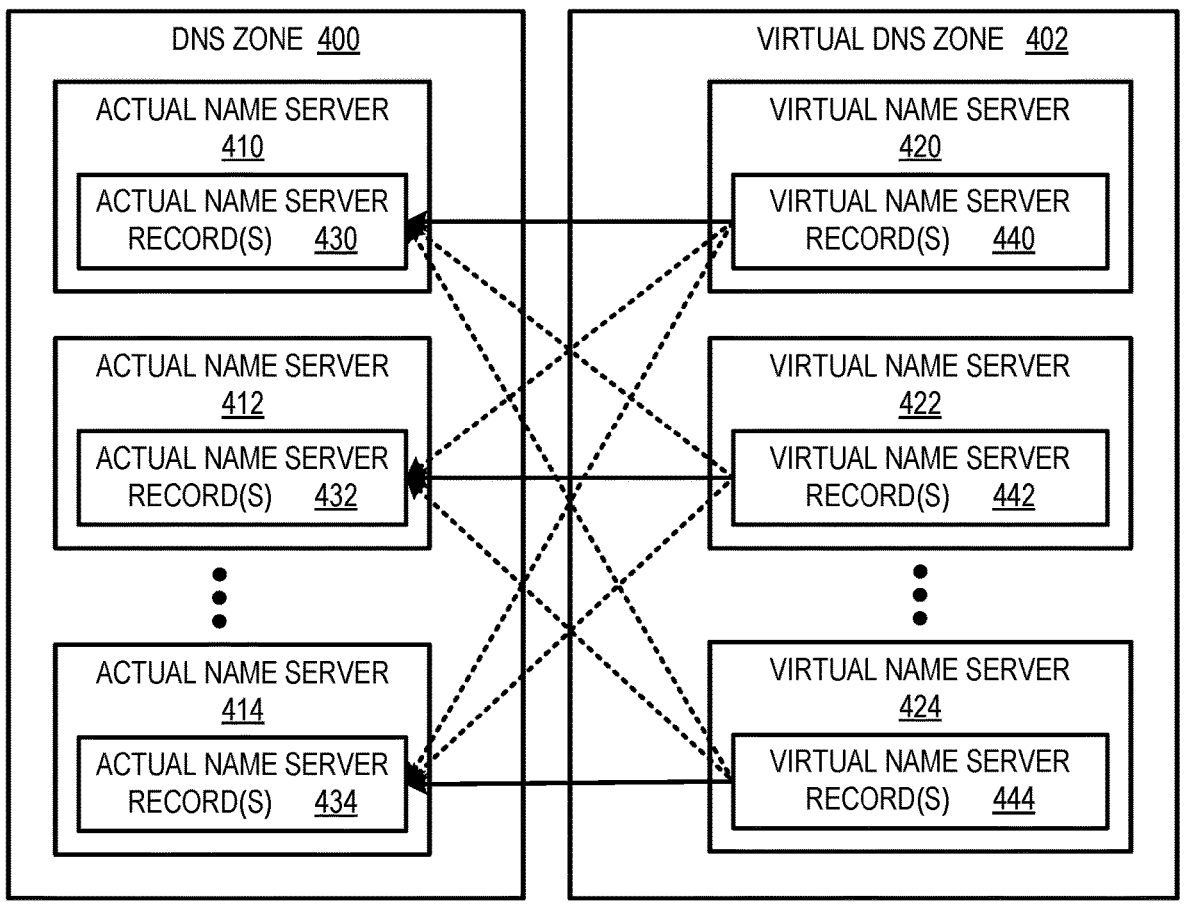
FIG. 4 schematically shows an example implementation in which actual name servers and virtual name servers are hosted in different DNS zones.

In some implementations, the actual name servers (e.g. 112, 114, or 116) and the virtual name servers (e.g. 118, 120, or 122) of the DNS (e.g. 102) may be distributed among various DNS zones. The virtual name servers (e.g. 118, 120, or 122) may be hosted in the same DNS zone as the actual name servers (e.g. 112, 114, or 116) or in the alternative, the virtual name servers (e.g. 118, 120, or 122) may be hosted in a different DNS zone than the actual name servers (e.g. 112, 114, or 116). FIGS. 3 and 4 schematically show different example arrangements of actual name servers and virtual name servers in a DNS (e.g. DNS 102).

In an alternative exemplary implementation, the monitoring service computer 124 may test whether each of virtual name servers (e.g. 118, 120, or 122 of FIG. 1) is healthy by sending DNS queries to the virtual name servers (e.g. 118, 120, or 122) of the DNS (e.g. 102). If it is determined from the responses to the DNS queries that one or more virtual name servers are unhealthy, the unhealthy virtual name servers may be updated to point to the same IP addresses as the healthy virtual name servers. In this implementation, the actual name servers (e.g. 112, 114, or 116 of FIG. 1) of the DNS (e.g. 102) may be monitored separately to allow an unhealthy name server to be put back into service once it is recovered.

In FIG. 3, a plurality of actual name servers (e.g. 310, 312, and 314) and a plurality of virtual name servers (e.g., 320, 322, and 324) are hosted in a same DNS zone 300. Each of a plurality of virtual name server records (e.g. 340, 342, or 344) associated with the plurality of virtual name servers (e.g., 320, 322, or 324) maps to one of a plurality of actual name server records (e.g. 330, 332, or 334) associated with the plurality of actual name servers (e.g. 310, 312, and 314). When a recovery service computer (e.g. 126 shown in FIG. 1) detects that any of the actual name servers (e.g. 310, 312, or 314) is unhealthy, the recovery service computer will update the virtual name server record (e.g. 340, 342, or 344) that maps to the unhealthy actual name server to map instead to a healthy actual name server. The healthy actual name server may be chosen at random from among the healthy actual name servers or by any other suitable method.

In FIG. 4, a plurality of actual name servers (e.g., 410, 412, and 414) are hosted an actual DNS zone 400 while a plurality of virtual name servers (e.g., 420, 422, and 424) are hosted in a virtual DNS zone 402. Each of a plurality of virtual name server records (e.g. 440, 442, or 444) associated with the plurality of virtual name servers (e.g., 420, 422, or 424) maps to one of a plurality actual name server records (e.g. 430, 432, or 434) associated with the plurality of actual name servers (e.g. 410, 412, or 414). Since the virtual name servers (e.g. 420, 422, and 424) are hosted in a different DNS zone than the actual name servers (410, 412, 414), resiliency of the system may be increased relative to the configuration where all name servers are in the same DNS zone. When a recovery service computer (e.g. 126 shown in FIG. 1) detects that any of the actual name servers (410, 412, or 414) is unhealthy, the recovery service computer will update the virtual name server record (e.g. 440, 442, or 444) that maps to the unhealthy actual name server to map instead to a healthy actual name server. The healthy actual name server may be chosen at random from among the healthy actual name servers or by any other suitable method.

Figure 5:
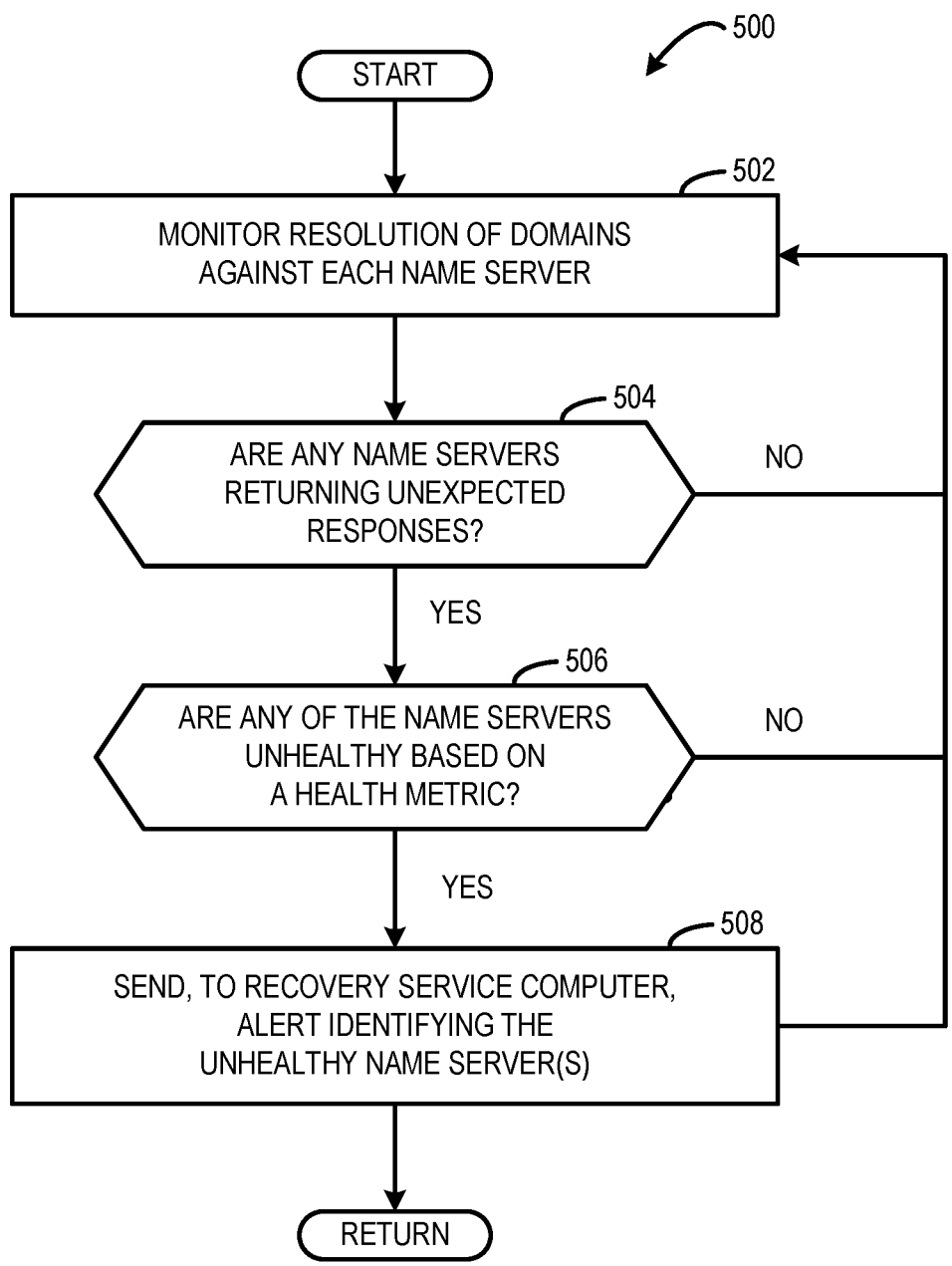
FIG. 5 shows aspects of a flowchart of an example method for monitoring health of a plurality of name servers of a DNS.

FIG. 5 shows aspects of a flowchart of an example method 500 for monitoring health of name servers of a DNS. The method 500 may be performed by the monitoring service computer 124 shown in FIG. 1 or by any other suitable computer. At 502, resolution of domains against each name server are monitored. In one exemplary implementation, the responses to DNS queries of each name server may be monitored to determine which name servers are returning undesirable responses. In another exemplary implementation, test DNS queries may be sent and the responses may be monitored to determine which name servers are returning undesirable responses. At 504, a determination is made as to whether any name servers are returning unexpected responses to DNS queries. In one exemplary implementation, an unexpected response may be specified to be a response that does not include one or more IP addresses. In another implementation, an expected response may be specified to be a response that matches a specific one or more errors codes (e.g. NXDOMAIN). In this implementation, only responses with the specified error code (e.g. NXDO-MAIN) would be considered an unexpected response. The criteria for what is considered an unexpected response may be specified in any suitable manner to identify undesirable behavior of name servers and to distinguish between the unhealthy and healthy name servers. If none of the name servers are returning unexpected responses, then the method 500 goes back to 502. Otherwise, then the method 500 moves to 506. At 506, a determination is made as to whether any of the name servers are unhealthy based on a health metric. For example, in one exemplary implementation, the health metric may indicate that a name server is unhealthy if it returns an unexpected response a number of times greater than a threshold number. In another exemplary implementation, the health metric may indicate that a name server is unhealthy if it returns a percentage of unexpected responses greater than a threshold percentage. If none of the name servers are unhealthy based on the health metric, then the method 500 goes back to 502. Otherwise, the method 500 moves to 508, where an alert is sent to a recovery service computer identifying the one or more unhealthy name servers. The recovery service computer may then choose to update the mapping of each of the virtual name server records that maps to an unhealthy name server to map to a healthy name server. Then, the method 500 goes back to 502, where resolution of domains against each name server are monitored. The method 500 may be repeated in this manner to test and continually monitor all name servers in the DNS.

Figure 6:
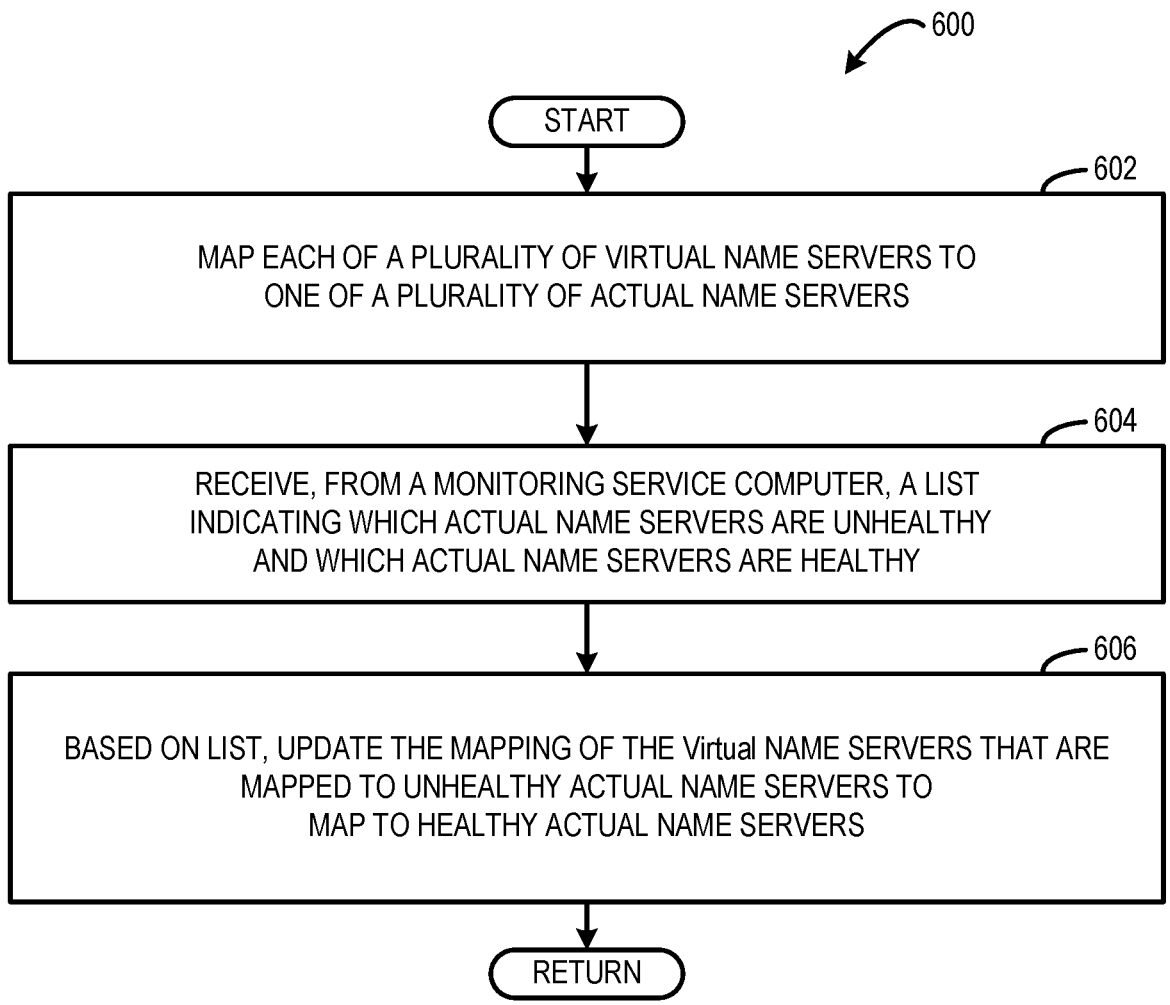
FIG. 6 shows aspects of a flowchart of an example method for managing name servers of a DNS.

FIG. 6 shows aspects of a flowchart of an example method 600 for managing name servers of a DNS. The method 600 may be performed by the recovery service computer 126 shown in FIG. 1 or any other suitable computer. At 602, each of a plurality of virtual name servers is mapped to one of a plurality of actual name servers of a DNS. Each actual name server stores one or more records. At least one of these records specifies a domain and an IP address of a computer hosting the domain. At 604, an alert or list may be received from a monitoring service computer via a computer network. In one exemplary implementation, an alert may be received that identifies one or more of the plurality of actual name servers as being unhealthy. Alternatively, in another exemplary implementation, a list may be received that indicates which actual name servers are healthy and which actual name servers are unhealthy. In one embodiment, an actual name server is determined to be healthy or unhealthy based on a health metric applied by the monitoring service computer. For example, if an actual name server provides an unexpected response, such as an error code, then the health metric may indicate that the actual name server is unhealthy. In another exemplary implementation, the health metric may indicate that an actual name server is unhealthy if it returns an unexpected response a number of times greater than a threshold number. In yet another exemplary implementation, the health metric may indicate that an actual name server is unhealthy if it returns a percentage of unexpected responses greater than a threshold percentage. At 606, based on the alert or the list, the mappings of the virtual name servers that are mapped to unhealthy actual name servers are updated to map to healthy actual name servers. In one exemplary implementation, for each virtual name server that is mapped to an unhealthy actual name server, the mapping may be updated to map to a healthy actual name server chosen at random from among the healthy actual name servers. In other implementations, the healthy actual name server that is chosen may be chosen by any other suitable method. By mapping the virtual name servers to the actual name servers in the manner described above, the mappings can be updated to divert network traffic away from an unhealthy actual name server to a healthy actual name server quickly and efficiently.

In some implementations, the methods and processes described herein may be tied to a computing system of one or more computing devices. In particular, such methods and processes may be implemented as a computer-application program or service, an application-programming interface (API), a library, and/or other computer-program product.

Figure 7:
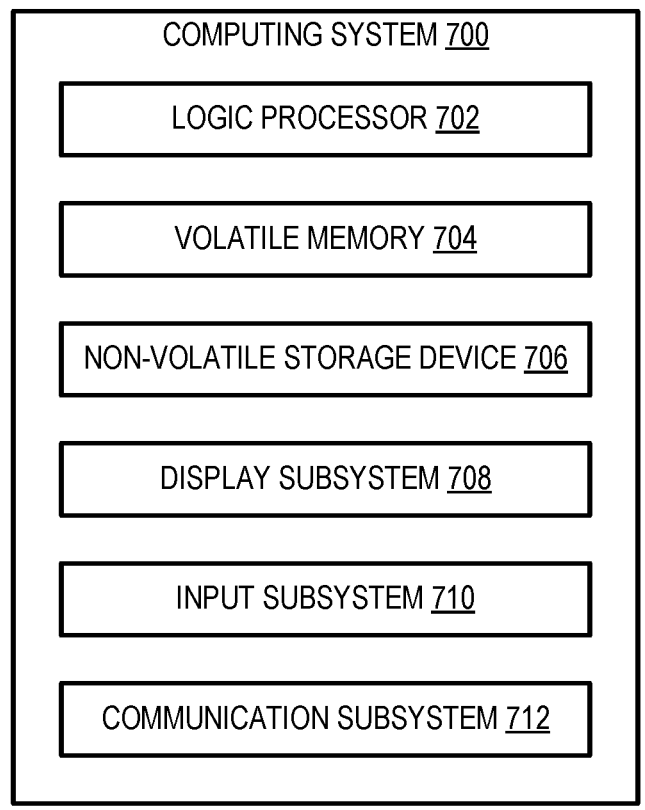
FIG. 7 schematically shows an example computing system.

FIG. 7 schematically shows a non-limiting implementation of a computing system 700 that can enact one or more of the methods and processes described above. Computing system 700 is shown in simplified form. Computing system 700 may embody any of the computers described above and illustrated in FIGS. 1-6 including the client computers (e.g. 104, 106, and 108), the actual name servers (e.g., 112, 114, and 116), the virtual name servers (e.g., 118, 120, and 122), the monitoring service computer 124, and the recovery service computer 126.

Computing system 700 may take the form of one or more personal computers, servers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 700 to send and/or receive messages to and/or from other devices via a network such as the Internet.

In an example, a method comprises mapping each of a plurality of virtual name servers to one of a plurality of actual name servers of a domain name system (DNS), each actual name server storing at least one record identifying a domain and an Internet Protocol (IP) address of a computer hosting that domain, receiving from a monitoring service computer communicatively coupled to the DNS via a computer network, an alert indicating that a first actual name server of the plurality of actual name servers is unhealthy, wherein the first actual name server is mapped to a first virtual name server of the plurality of virtual name servers, and based on the alert, updating the mapping of the first virtual name server from being mapped to the first actual name server to being mapped to a second actual name server of the plurality of actual name servers that is determined to be healthy. In this example and/or other examples, receiving the alert that the first actual name server is unhealthy may comprise receiving the alert that the first actual name server is unhealthy based on a health metric applied by the monitoring service computer. In this example and/or other examples, the health metric may indicate that the first actual name server is unhealthy based on at least a threshold number of client computers receiving a response to a DNS query that is different from an expected response from the first actual name server. In this example and/or other examples, the health metric may indicate that the first actual name server is unhealthy based on client computers receiving at least a threshold percentage of responses to DNS queries that are different from an expected response. In this example and/or other examples, the health metric may indicate that the first actual name server is unhealthy based on at least a threshold number of requesting client computers receiving a NXDOMAIN error from the first actual name server. In this example and/or other examples, updating the mapping of the first virtual name server from being mapped to the first actual name server to being mapped to the second actual name server may comprise updating a virtual name record associated with the first virtual name server to point to the second actual name server. In this example and/or other examples, the plurality of virtual name servers and the plurality of actual name servers may be hosted in a same DNS zone. In this example and/or other examples, the plurality of virtual name servers may be hosted in a virtual DNS zone.

In an example, a computing system comprises a plurality of actual name servers, each actual name server storing at least one record including a domain and an Internet Protocol (IP) address of a computer hosting the domain, a plurality of virtual name servers, each virtual name server mapped to one of the plurality of actual name servers, and a recovery service computer configured to receive, from a monitoring service computer via a computer network, an indication identifying that a first actual name server of the plurality of actual name servers is unhealthy and a second actual name server of the plurality of actual name servers is healthy, wherein the first actual name server is mapped to a first virtual name server of the plurality of virtual name servers, and based on the indication received from the monitoring service computer, update the mapping of the first virtual name server from being mapped to the first actual name server to being mapped to the second actual name server. In this example and/or other examples, the first actual name server may be identified as being unhealthy and the second actual name server may be identified as being healthy based on a health metric applied by the monitoring service computer. In this example and/or other examples, the health metric may indicate that the first actual name server is unhealthy based on at least a threshold number of client computers receiving a response different than an expected response from the first actual name server, and the health metric may indicate that the second actual name server is healthy based on less than the threshold number of client computers receiving a response different than an expected response from the second actual name server. In this example and/or other examples, the health metric may indicate that the first actual name server is unhealthy based on client computers receiving at least a threshold percentage of responses to DNS queries that are different from an expected response, and the health metric may indicate that the second actual name server is healthy based on client computers receiving less than the threshold percentage of responses to DNS queries that are different from an expected response. In this example and/or other examples, the recovery service computer being configured to update the mapping of the first virtual name server from being mapped to the first actual name server to being mapped to the second actual name server may comprise the recovery service computer being configured to update a virtual name record associated with the first virtual name server to point to the second actual name server. In this example and/or other examples, the plurality of virtual name servers and the plurality of actual name servers may be hosted in a same DNS zone. In this example and/or other examples, the plurality of virtual name servers may be hosted in a virtual DNS zone.

In an example, a method for managing name servers of a domain name system (DNS) comprises mapping each of a plurality of virtual name servers to one of a plurality of actual name servers of the DNS, receiving from a monitoring service computer communicatively coupled to the DNS via a computer network, a list identifying which of the plurality of actual name servers are unhealthy and which of the plurality of actual name servers are healthy, and based on the list, updating the mappings of each of the virtual name servers that map to an unhealthy actual name server to map to a healthy actual name server. In this example and/or other examples, updating the mappings of each of the virtual name servers that map to an unhealthy actual name server to map to a healthy actual name server may comprise updating the mappings of each of the virtual name servers that map to an unhealthy actual name server to map to a healthy actual name server chosen at random from one or more healthy actual name servers. In this example and/or other examples, each actual name server may be identified as healthy or unhealthy based on a health metric applied by the monitoring service computer. In this example and/or other examples, updating the mappings of each of the virtual name servers that map to an unhealthy actual name server to map to a healthy actual name server may comprise updating a virtual name server record for each of the virtual name servers that map to an unhealthy actual name server to point to a healthy actual name server. In this example and/or other examples, the one or more virtual name servers may be hosted in a virtual DNS zone.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method comprising:
mapping each of a plurality of virtual name servers to one of a plurality of actual name servers of a domain name system (DNS), each actual name server storing at least one record identifying a domain and an Internet Protocol (IP) address of a computer hosting that domain;
receiving, from a monitoring service computer communicatively coupled to the DNS via a computer network, an alert indicating that a first actual name server of the plurality of actual name servers is unhealthy based on a health metric indicating that the first actual name server is unhealthy based on at least a threshold number of client computers receiving a response to a DNS query from the first actual name server for an IP address of a computer hosting a requested domain, wherein the response indicates an error that the requested domain does not exist even though the IP address of the computer hosting the requested domain is actually stored in memory of the first actual name server, wherein the first actual name server is mapped to a first virtual name server of the plurality of virtual name servers; and
based on the alert, updating the mapping of the first virtual name server from being mapped to the first actual name server to being mapped to a second actual name server of the plurality of actual name servers that is determined to be healthy.

2. The method of claim 1, wherein the error is a NXDOMAIN error.

3. The method of claim 1, wherein updating the mapping of the first virtual name server from being mapped to the first actual name server to being mapped to the second actual name server comprises updating a virtual name record associated with the first virtual name server to point to the second actual name server.

4. The method of claim 1, wherein the plurality of virtual name servers and the plurality of actual name servers are hosted in a same DNS zone.

5. The method of claim 1, wherein the plurality of virtual name servers are hosted in a virtual DNS zone.

6. A computing system comprising:
a plurality of actual name servers, each actual name server storing at least one record including a domain and an Internet Protocol (IP) address of a computer hosting the domain;
a plurality of virtual name servers, each virtual name server mapped to one of the plurality of actual name servers; and
a recovery service computer configured to:
receive, from a monitoring service computer via a computer network, an indication identifying that a first actual name server of the plurality of actual name servers is unhealthy based on a health metric indicating that the first actual name server is unhealthy based on at least a threshold number of client computers receiving a response to a DNS query from the first actual name server for an IP address of a computer hosting a requested domain, wherein the response indicates an error that the requested domain does not exist even though the IP address of the computer hosting the requested domain is actually stored in memory of the first actual name server, and a second actual name server of the plurality of actual name servers is healthy based on the health metric indicating that the second actual name server is healthy based on less than the threshold number of client computers receiving a response to a DNS query from the second actual name server that indicates the error, wherein the first actual name server is mapped to a first virtual name server of the plurality of virtual name servers; and
based on the indication received from the monitoring service computer, update the mapping of the first virtual name server from being mapped to the first actual name server to being mapped to the second actual name server.

7. The computing system of claim 6, wherein the recovery service computer to update the mapping of the first virtual name server from being mapped to the first actual name server to being mapped to the second actual name server comprises the recovery service computer to update a virtual name record associated with the first virtual name server to point to the second actual name server.

8. The computing system of claim 6, wherein the plurality of virtual name servers and the plurality of actual name servers are hosted in a same DNS zone.

9. The computing system of claim 6, wherein the plurality of virtual name servers are hosted in a virtual DNS zone.

10. The computing system of claim 6, wherein the error is a NXDOMAIN error.

11. A method for managing name servers of a domain name system (DNS), the method comprising:
mapping each of a plurality of virtual name servers to one of a plurality of actual name servers of the DNS;
receiving, from a monitoring service computer communicatively coupled to the DNS via a computer network, a list identifying which of the plurality of actual name servers are unhealthy and which of the plurality of actual name servers are healthy based on a health metric, wherein the health indicates that an actual name server is healthy based on less than a threshold number of client computers receiving a response to a DNS query from the actual name server for an IP address of a computer hosting a requested domain, wherein the response indicates an error that the requested domain does not exist even though the IP address of the computer hosting the requested domain is actually stored in memory of the actual name server, and wherein the health metric indicates that an actual name server is unhealthy based on at least a threshold number of client computers receiving a response to a DNS query from the actual name server that indicates the error; and based on the list, updating the mappings of each of the virtual name servers that map to an unhealthy actual name server to map to a healthy actual name server.

12. The method of claim 11, wherein updating the mappings of each of the virtual name servers that map to an unhealthy actual name server to map to a healthy actual name server comprises updating the mappings of each of the virtual name servers that map to an unhealthy actual name server to map to a healthy actual name server chosen at random from one or more healthy actual name servers.

13. The method of claim 11, wherein updating the mappings of each of the virtual name servers that map to an unhealthy actual name server to map to a healthy actual name server comprises updating a virtual name server record for each of the virtual name servers that map to an unhealthy actual name server to point to a healthy actual name server.

14. The method of claim 11, wherein the one or more virtual name servers are hosted in a virtual DNS zone.

15. The method of claim 11, wherein the error is a NXDOMAIN error.

* * * * *